United States Patent
Roger et al.

(10) Patent No.: US 12,055,482 B2
(45) Date of Patent: Aug. 6, 2024

(54) INTEGRATED SENSOR MODULES FOR DETECTION OF CHEMICAL SUBSTANCES

(71) Applicant: ams International AG, Jona (CH)

(72) Inventors: Frederic Roger, Eindhoven (NL); Troy Chesler, Eindhoven (NL)

(73) Assignee: ams International AG, Jona (CH)

( * ) Notice: Subject to any disclaimer, the term of this patent is extended or adjusted under 35 U.S.C. 154(b) by 759 days.

(21) Appl. No.: 17/252,184

(22) PCT Filed: Jun. 14, 2019

(86) PCT No.: PCT/EP2019/065660
§ 371 (c)(1),
(2) Date: Dec. 14, 2020

(87) PCT Pub. No.: WO2019/238915
PCT Pub. Date: Dec. 19, 2019

(65) Prior Publication Data
US 2021/0255097 A1 Aug. 19, 2021

Related U.S. Application Data

(60) Provisional application No. 62/684,887, filed on Jun. 14, 2018.

(51) Int. Cl.
*G01N 21/33* (2006.01)
*G01J 3/12* (2006.01)
(Continued)

(52) U.S. Cl.
CPC ............... *G01N 21/33* (2013.01); *G01J 3/26* (2013.01); *G01J 3/2803* (2013.01); *G01J 2003/1226* (2013.01)

(58) Field of Classification Search
CPC .......... G01N 21/33; G01J 3/26; G01J 3/2803; G01J 2003/1226
See application file for complete search history.

(56) References Cited

U.S. PATENT DOCUMENTS 5,130,776 A * 7/1992 Popovic ................ H01L 31/103
257/E31.054
5,936,250 A 8/1999 Baliga et al.
(Continued)

FOREIGN PATENT DOCUMENTS

| CA | 2460071 A1 | 3/2003 |
| CN | 101378067 A | 3/2009 |

(Continued)

OTHER PUBLICATIONS

PCT/EP2019/065660 International Search Report and Written Opinion Mailed Sep. 5, 2019, 16 pages.
(Continued)

*Primary Examiner* — Chih-Cheng Kao
(74) *Attorney, Agent, or Firm* — VIERING, JENTSCHURA & PARTNER mbB

(57) ABSTRACT

An integrated sensor module includes a UV radiation source operable to emit UV radiation onto a sample, and a sensor including spectrally sensitive UV channels disposed so as receive UV radiation from the sample. Each of the UV channels includes a respective sensing device and a respective UV interference filter disposed over a UV radiation sensitive portion of the respective sensing device. The respective UV interference filter for each particular one of the channels has transmission characteristics that are spectrally responsive to a spectral signature of a respective chemical substance.

18 Claims, 4 Drawing Sheets

(51) Int. Cl.
*G01J 3/26* (2006.01)
*G01J 3/28* (2006.01)

(56) References Cited

U.S. PATENT DOCUMENTS

| | | | |
|---|---|---|---|
| 8,124,936 B1* | 2/2012 | Lagna | G01J 3/36 |
| | | | 250/339.01 |
| 2005/0077476 A1* | 4/2005 | Poteet | G16H 10/40 |
| | | | 250/461.1 |
| 2007/0081156 A1 | 4/2007 | Treado et al. | |
| 2007/0138401 A1* | 6/2007 | Tokhtuev | G01J 3/12 |
| | | | 250/373 |
| 2007/0200067 A1* | 8/2007 | Yoshida | G01N 21/33 |
| | | | 250/373 |
| 2008/0135780 A1* | 6/2008 | Giering | G07D 7/1205 |
| | | | 250/459.1 |
| 2010/0097599 A1 | 4/2010 | Lewis et al. | |
| 2011/0007309 A1 | 1/2011 | Stewart et al. | |
| 2012/0065948 A1 | 3/2012 | Tan et al. | |
| 2016/0131525 A1 | 5/2016 | Edwards et al. | |
| 2017/0248472 A1 | 8/2017 | Roentgen et al. | |
| 2020/0149967 A1 | 5/2020 | Siess | |
| 2023/0266234 A1 | 8/2023 | Oeguen et al. | |

FOREIGN PATENT DOCUMENTS

| | | |
|---|---|---|
| CN | 103983356 A | 8/2014 |
| CN | 104677870 A | 6/2015 |
| CN | 110678723 A | 1/2020 |
| CN | 111380816 A | 7/2020 |
| CN | 116137891 A | 5/2023 |
| EP | 1260878 A2 | 11/2002 |
| KR | 20050025734 A | 3/2005 |
| SU | 1000778 A1 | 2/1983 |
| WO | 2017174798 A1 | 10/2017 |

OTHER PUBLICATIONS

PCT/EP2019/065660 International Search Report and Written Opinion, mailed Aug. 28, 2019, 16 pages.

Chinese Office Action for corresponding Chinese Application No. 201980053457.X, dated Feb. 26, 2024, 21 pages (for informational purposes only).

* cited by examiner

INTEGRATED SENSOR MODULES FOR DETECTION OF CHEMICAL SUBSTANCES

CROSS-REFERENCE TO RELATED APPLICATIONS

This application is a 371 U.S. National Phase of PCT International Patent Application No. PCT/EP2019/065660, filed on Jun. 14, 2019, which claims benefit and priority to U.S. provisional patent application No. 62/684,887 filed on Jun. 14, 2018, the disclosures of which are each incorporated by reference herein in their entirety for all purposes.

FIELD OF THE DISCLOSURE

This disclosure relates to integrated sensor modules for the detection of chemical substances.

BACKGROUND

Various techniques have been proposed for testing chemical substances in laboratory and point-of-care settings. Such tests can be used, for example, for forensic testing of samples to detect the presence of illicit substances (e.g., drugs). The tests can be used, for example, to assist police of other governmental enforcement agencies, as well as by hospitals, harm reduction agencies and patient clinics that care for patients or persons in drug rehabilitation facilities.

The following are examples of techniques that can be used to test for chemical substances: mass spectrometry; infrared spectrometry, Raman spectrometry, x-ray spectrometry, thin-layer chromatography, ultraviolet spectroscopy, spot/color tests, microcrystalline tests, immunoassays and urine dipstick tests. The techniques differ in their ability to discriminate among different substances, in the range of substances that can be detected and discriminated, in their ability to determine the quantity of the particular substance detected, in the relative costs of the tests, and in the ease of using the tests.

In general, it is desirable to provide a low cost integrated sensor that can detect and discriminate among a wide range of chemical substances. Preferably, the sensor should provide increased accuracy and be relatively simple to use.

SUMMARY

This disclosure describes integrated sensor modules for the detection of chemical substances.

For example, in one aspect, the disclosure describes an integrated sensor module that includes a UV radiation source operable to emit UV radiation onto a sample, and a sensor including a plurality of spectrally sensitive UV channels disposed so as receive UV radiation from the sample. Each of the UV channels includes a respective sensing device and a respective UV interference filter disposed over a UV radiation sensitive portion of the respective sensing device. The respective UV interference filter for each particular one of the channels has transmission characteristics that are spectrally responsive to a spectral signature of a respective chemical substance.

Some implementations include one or more of the following features. For example, in some instances, the sensor is operable to integrate signals in each of the plurality of UV channels in parallel. The sensor module can include a signal processor operable to perform signal processing of signals from the UV channels to determine whether a respective responsivity matches or aligns with the spectral signature of the chemical substance associated with any particular one of the UV channels.

In accordance with another aspect, a method includes placing a sample in an integrated sensor module operable for detection of chemical substances, and emitting UV radiation from a UV radiation source onto the sample. The method further includes receiving UV radiation from the sample in each of a plurality of spectrally sensitive UV channels, each of the UV channels including a respective sensing device and a respective UV interference filter disposed over a UV radiation sensitive portion of the respective sensing device. The respective UV interference filter for each particular one of the channels has transmission characteristics that are spectrally responsive to a spectral signature of a respective chemical substance. The method includes providing a respective integrated signal from each of the UV channels to a signal processor, and determining, based at least in part on the respective integrated signals from the UV channels, whether a respective responsivity matches or aligns with the spectral signature of the chemical substance associated with any particular one of the UV channels.

In some implementations, the method includes integrating signals in each of the UV channels in parallel. Determining whether a respective responsivity matches or aligns with the spectral signature of the chemical substance associated with any particular one of the UV channels can include comparing the respective integrated signals from the UV channels to respective predetermined values. In some instances, the method includes identifying a composition of the sample based at least in part on the comparison.

Other aspects, features and advantages will be readily apparent from the following detailed description, the accompanying drawings, and the claims.

DETAILED DESCRIPTION

The present disclosure describes an integrated sensor module operable to detect and discriminate among different chemical substances, such as particulate matter (e.g., molecules of illegal drugs) present in a sample. The sensor module is operable, in some instances, for real-time measurements in which a radiation source emits ultraviolet (UV) radiation toward the sample, and UV radiation reflected by the sample is detected and integrated in an array of spectrally sensitive UV channels. The array can include multiple UV channels each of which is spectrally sensitive, and isolated, to a particular chemical substance (e.g., a drug).

Figure 1:
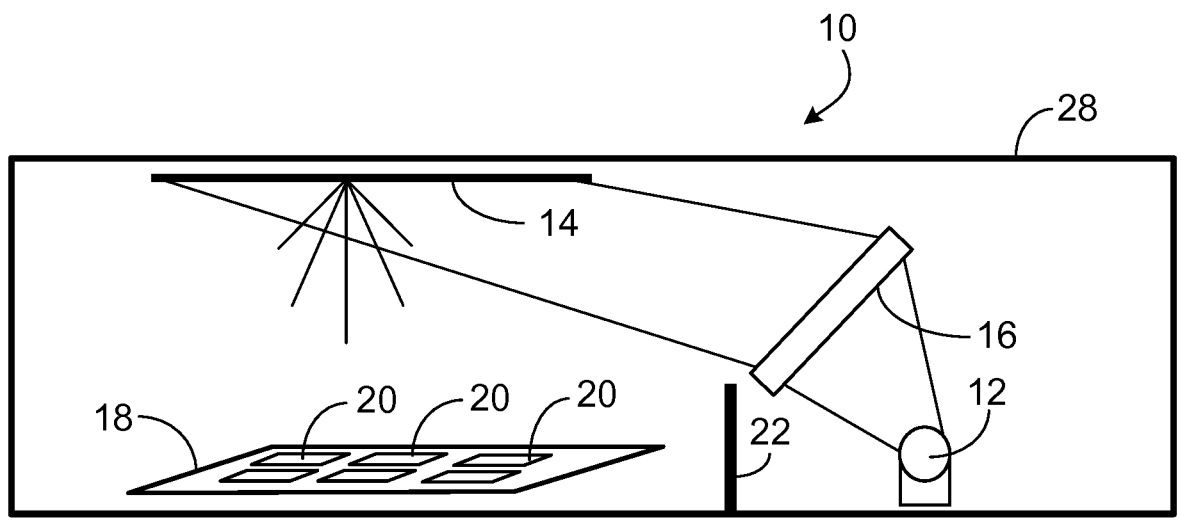
FIG. 1 illustrates an example of a chemical substance detection sensor module.

As illustrated in the example of FIG. 1, a chemical substance detection sensor module 10 includes an optical source 12 operable to emit UV radiation toward a sample 14 (e.g., a solid, liquid or gas). The radiation source 12 can include, for example, a tunable monochromatic UV light source operable to emit radiation in the range of about 200-400 nm. In some instances, the radiation source 12 also includes a second switchable broad band radiation source operable to emit longer wavelengths (e.g., up to 900 nm) that can be used to test the fluorescence effect of the sample 14 (i.e., to detect a peak wavelength reflected by the sample). An optical system 16, including one or more lenses or other optical elements, can be provided in the path of the radiation emitted by the source 12 so as to focus the emitted radiation onto the sample 14. At least some of the radiation reflected by the sample can be sensed by a sensor 18 that includes an array of radiation sensitive channels 20.

Each channel 20 incorporates a respective UV sensitive photodiode as well as a UV interference filter having transmission characteristics that are spectrally responsive to the spectral signature of a respective drug or other chemical substance. Thus, for example, if the sensor 18 includes an array of fifty channels 20, the module 10 can be operable to detect up to fifty different chemical substances, each of which has a spectral signature that differs from the spectral signature of the chemical substances detectable by the other channels 20.

A radiation shield 22 can be disposed between the radiation source 12 and the sensor 18 so as to prevent radiation emitted by the source 12 from directly impinging on the channels 20 of the sensor 18. Preferably, the shield 12 is composed of a material that is non-reflective and non-transmissive for UV radiation. The module 10 can be contained in a dark, non-reflective chamber 28 that isolates the sensor 18 from external parasitic radiation.

Figure 2:
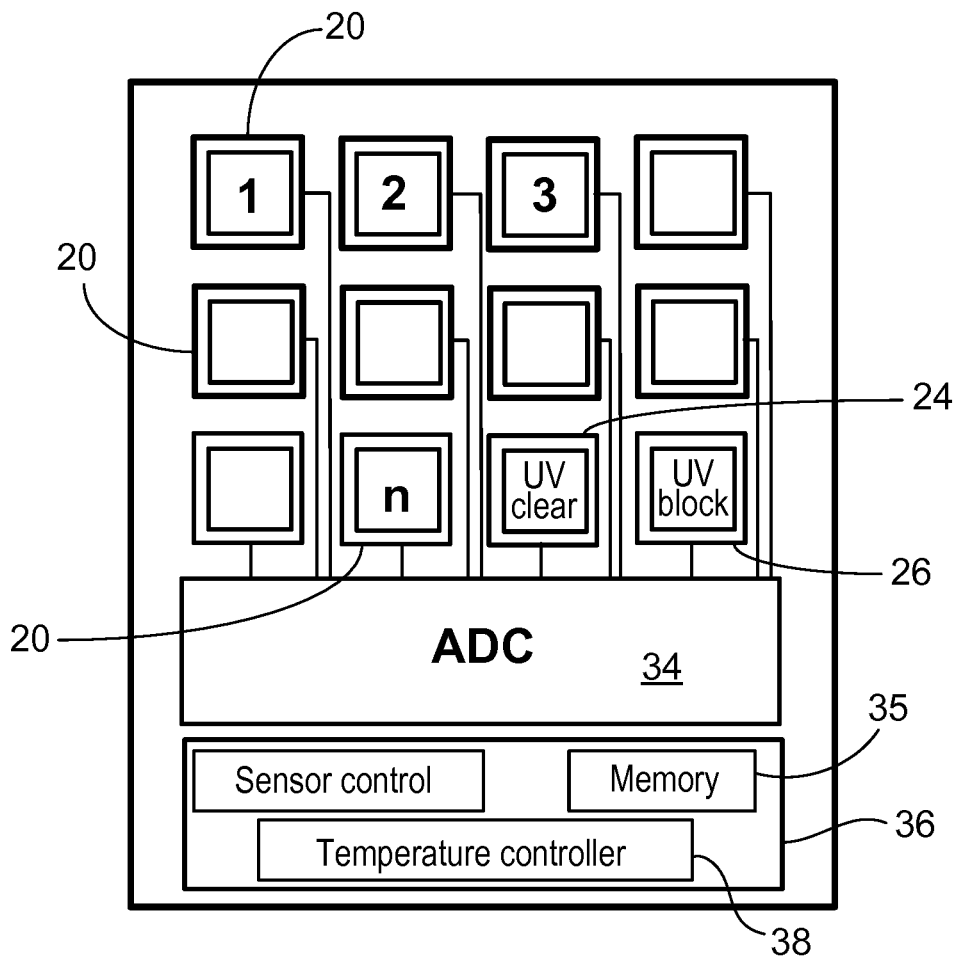
FIG. 2 is a block diagram illustrating various functional components of the sensor module.

As shown in FIG. 2, in addition to the UV sensitive channels 20, the sensor 18 can include additional channels to help discriminate and measure the UV in-band and out-band radiation. For example, the sensor 18 can include a clear UV channel 24 having a band pass filter that selectively passes, for example, UV radiation in a predetermined range (e.g., 200-400 nm). Thus, the UV clear channel 24 is operable to measure the overall UV response of the sample 14 within the predetermined UV range. Further, the sensor 18 can include a UV block channel 26, which passes non-UV radiation (e.g., visible light and infrared (IR) radiation), but blocks UV radiation. The UV block channel 26 allows the module 10 to measure the out of band radiation seen by the sample 14.

Figure 3:
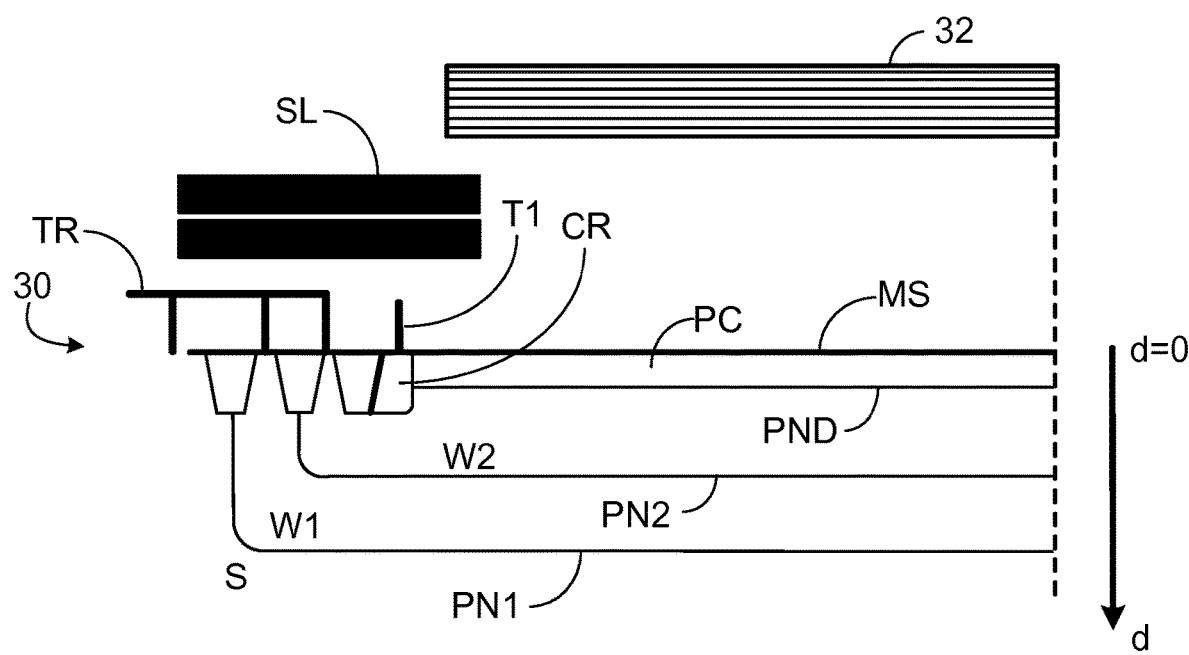
FIG. 3 is a schematic illustrating an example of a UV sensing device.

As illustrated in the example of FIG. 3, each channel 20 contains a dedicated UV sensing device having a UV photodiode structure 30 and a dedicated UV-type filter 32. Preferably, the photodiode structure in each channel 20 has a strong photo-response in the UV part of the spectrum (e.g., 200-400 nm), and has a reduced photo-response in the visible and IR parts of the spectrum.

Various chemical substances (e.g., drugs) inherently have unique spectral responses to the UV light source 12. A customized interference filter 32, specific to a particular drug's spectral response, is provided for either band pass or band reject operation. The interference filter 32 used for a particular channel 20 corresponds to the spectral response of the molecule to be sensed by that channel. Incorporating the respective interference filter 32 for each channel 20 facilitates the module's ability to discern the type of drug or other chemical substance present in the sample 14. The photodiode 30 in each particular drug detection channel 20 integrates the sensed UV radiation over time for the various wavelengths within the band as defined by the filter 32 for that channel.

To improve sensitivity, the expected spectral response of each chemical substance can be convoluted with the spectral responsivity of the photodiode's silicon so as to compensate for the spectral responsivity reduction of silicon at 270 nm. Thus, the interference filter 32 for each respective channel 20 can be configured to pass more light for those wavelengths where the UV photodiode 30 is not as sensitive, and to pass less light for those wavelengths where the UV photodiode 30 is more sensitive. In this way, the interference filter 32 for each channel 20 can be customized to reflect the inherent sensitivity versus wavelength of the UV filter. The convoluted curve thus represents the transmission definition of the interference filter dedicated to the specific chemical substance that the particular channel 20 is designed to detect.

Figure 4:
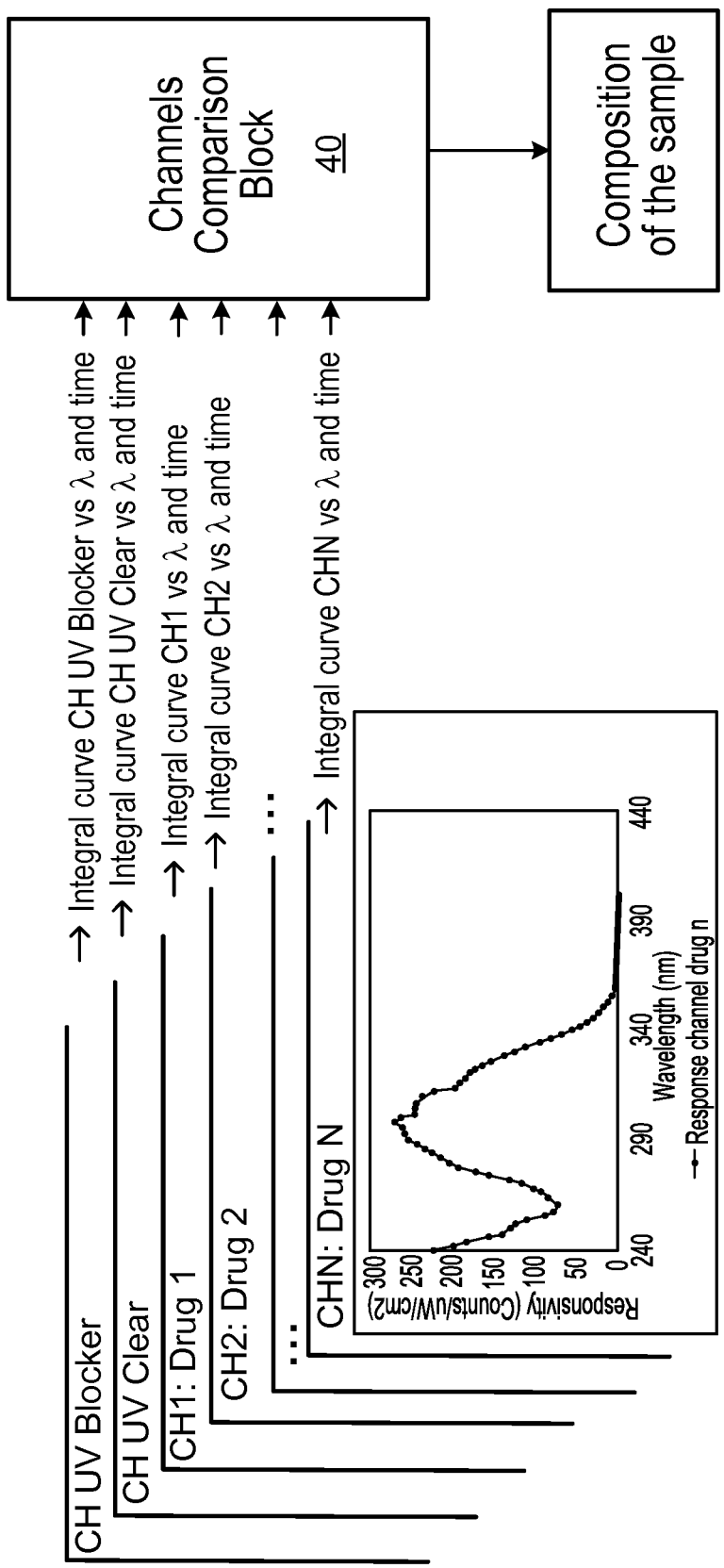
FIG. 4 is a schematic illustrating signal processing of signals from the sensor module channels.

As further illustrated in FIG. 2, the sensor module 10 includes an analog-to-digital converter (ADC) 34 to measure the photocurrent generated by the photodiode 30 in each channel 20, 24, 26. The output responses then are transmitted to signal processing circuitry 36 for signal treatment and data analysis so as to identify whether any of the predetermined chemical substances are present in the sample 14, as well as the quantity of each chemical substance. The signal processing circuitry 36 is operable to identify the chemical substance(s) in the sample 14 based on an analysis of the output signals from the channels 20. As indicated by FIG. 4, the sensor 18 is operable to integrate signals in multiple UV channels 20 in parallel (i.e., simultaneously) and to perform signal processing to discern responsivities that match or align with a particular spectral signature of a drug or other chemical substance. The integrated signal from each channel is provided to a comparison block 40 (see FIG. 4) which is operable to compare the output signal from each channel 20 to a respective predetermined value stored in memory 35 (see FIG. 2). The comparison block 40 can be integrated into the signal processing circuitry 36. Ratio-metric cross analysis of multiple drug substances within a single integrated system allows for quick analysis and detection by implementing relative comparisons of each channel's output responsivity.

Signals generated by the UV clear channel 24 and the UV block channel 26 can serve as reference signals. For example, a signal from the UV block channel 26 can be processed and used by the signal processing circuitry 36 to normalize the signals obtained from the UV channels 20. Likewise, a signal from the UV clear channel 24 can be processed and used by the signal processing circuitry 36 to improve signal/noise ratio. Signals from the UV clear and UV block channels 24, 26 also can be used to improve the overall signal acquisition process by detecting and accounting for background radiation.

In some instances, the sensor 18 has two channels for each chemical substance of interest. A first one of channels is configured to sense the response of the sample 14 based on its response to UV illumination as described above; the second channel is configured to sense the fluorescence effect of the sample 14. In such cases, the signal processing circuitry 36 also is operable to analyze outputs from the channels 20 based on the fluorescence effect of the sample 14. By analyzing signals output by the channels 20 when the sample 14 is illuminated 14 directly with UV radiation, as well as signals output by the channels 20 resulting from the fluorescent effect, greater accuracy can be achieved in identifying the chemical substance of the sample 14. In some cases, the sample 14 may emit radiation in the UV range even in the absence of illuminating the sample with UV radiation. In such instances, it may be unnecessary to illuminate the sample 14 with UV radiation from the tunable monochromatic UV light source.

In some implementations, the module 10 includes an on-die temperature sensor coupled to a temperature controller 38 to provide temperature-dependent leakage current compensation of the UV photodiode 30 in each channel 20. Incorporating the temperature controller 38 can aid in temperature-drift offset correction from the front-end ADC 34 resulting from photodiode leakage and general transistor leakage from the analog front-end. The temperature controller 38 also can be incorporated as part of the signal processing circuitry 36.

The signal processing circuitry 36 can be implemented, for example, as an integrated circuit. In some cases, the processing circuitry 36 may include software and/or firmware. An output of the signal processing circuitry 36 can be coupled, for example, to a monitor or other display unit to indicate whether there is a match between the chemical substance of the sample 14 and the spectral signature associated with any one of the channels 20 and, if so, to identify the chemical substance detected, as well as the quantity detected.

In some implementations, a photodiode structure 30 suitable for use in the channels 20 of the sensor 18 includes a superposition of two wells, in particular two ion-implanted wells, with opposite types of electrical conductivity within a semiconductor substrate. The semiconductor substrate has a first type of electrical conductivity, whereas a first well has a second type, and a second well has the first type. By adjusting doping concentrations or profiles of the wells, a photon capturing layer having the second type of electrical conductivity is formed at a main surface of the semiconductor substrate. A p-n junction formed between the photon capturing layer and the second well is usable for detecting incident UV radiation. The photodiode structure 30 can be implemented, for example, in a semiconductor wafer or a semiconductor die and/or can be part of an integrated circuit.

As shown in the example of FIG. 3, the UV photodiode structure 30 includes a semiconductor substrate S including a semiconductor material, for example silicon, and having a first type of electrical conductivity, for example p-type conductivity. The photodiode structure further includes a first well W1 arranged within the semiconductor substrate S and having a second type of electrical conductivity opposite to the first type, the second type being, for example, n-type conductivity. The photodiode structure 30 further includes a second well W2 arranged, for example, within the first well W1 and having the first type of electrical conductivity. Consequently, a first p-n junction PN1 is formed by a boundary between the semiconductor substrate S and the first well W1, and a second p-n junction PN2 is formed by a boundary between the first well W1 and the second well W2. Advantageously, such a photodiode structure is predominantly sensitive to UV radiation, and the sensitivity to visible light or infrared radiation is reduced.

Within a surface region at a main surface MS of the semiconductor substrate S, a doping concentration, in particular a carrier concentration, of the first well W1 is greater than a doping concentration, in particular a carrier concentration, of the second well W2. Therefore, a photon capturing layer PC having the second type of electrical conductivity is formed at the main surface MS, in particular in the surface region. Thus, a detection p-n junction PND is formed by a boundary between the second well W2 and the photon capturing layer PC. In this example, a part of the second well W2 not corresponding to the photon capturing layer PC is denoted as the second well W2, and a part of the first well W1 corresponding neither to the second well W2 nor to the photon capturing layer PC is denoted as the first well W1.

In the example of FIG. 3, the photodiode structure 30 includes a contact region CR having the second type of electrical conductivity within the semiconductor substrate for contacting the photon capturing layer PC. The photodiode structure 30 further includes a first sense terminal T1 connected to the photon capturing layer PC, for example, via the contact region CR. Furthermore, the photodiode structure 30 can include a reference terminal TR connected to the semiconductor substrate S, the first well W1 and second well W2. In some implementations, the reference terminal TR is connected to the semiconductor substrate S and the first well W1, and the photodiode device includes a further reference terminal connected to the second well W2.

A photodiode structure 30 of the sensor device of FIG. 3 is formed by the first and the second wells W1, W2 and the resulting photon capturing layer PC. In particular, the detection p-n junction PND can be used to detect UV radiation. A photocurrent generated within the depletion region of the detection p-n junction PND can, for example, be read out or measured via the first sense terminal T1.

In some implementations, other structures can be used for the UV radiation sensing device in each channel of the sensor 18.

Figure 5:
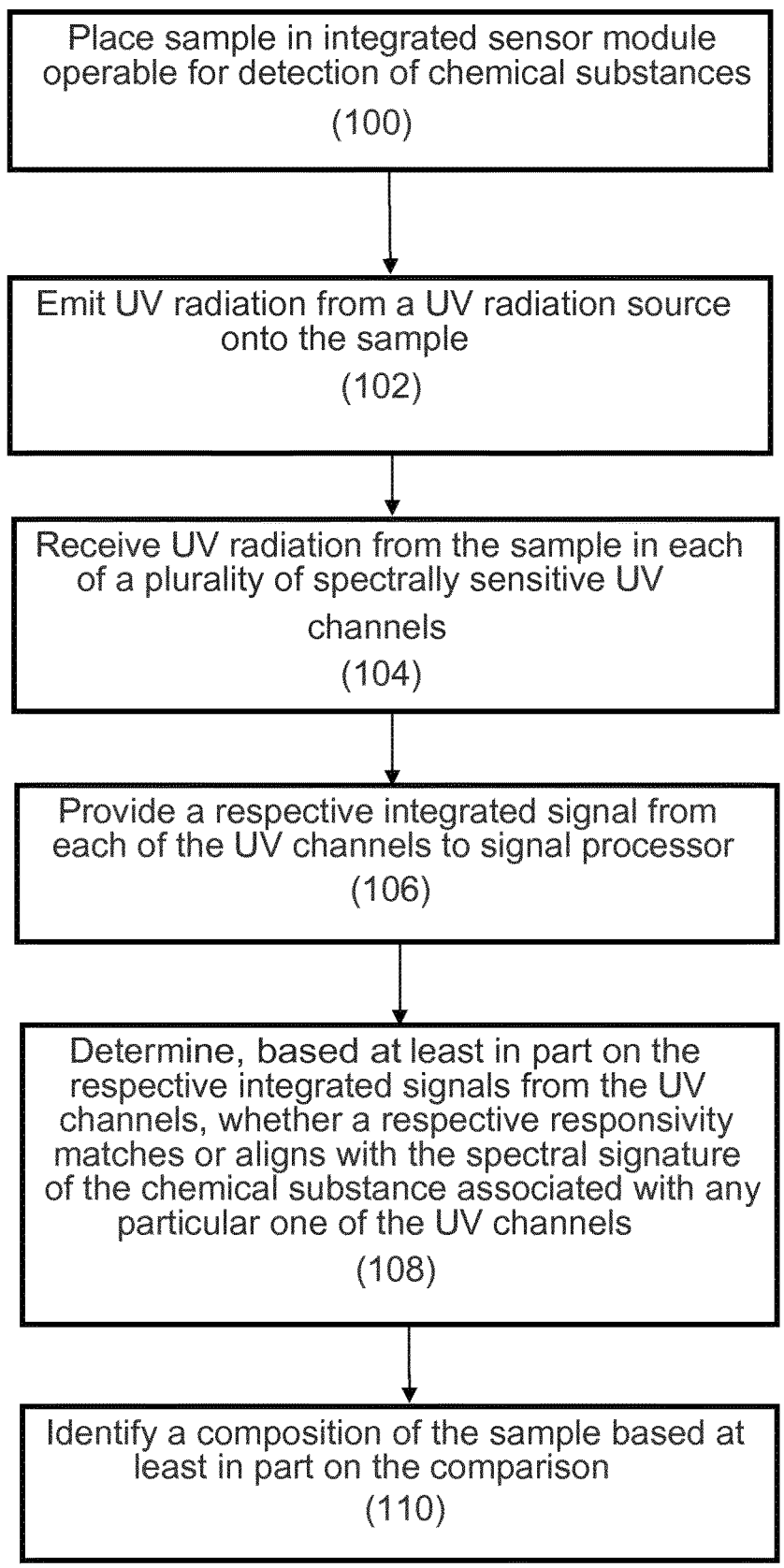
FIG. 5 is a flow chart illustrating a method in accordance with the present disclosure.

FIG. 5 illustrates a method in accordance with the present disclosure. The method includes placing a sample in an integrated sensor module operable for detection of chemical substances (100), and emitting UV radiation from a UV radiation source onto the sample (102). The method further includes receiving UV radiation from the sample in each of a plurality of spectrally sensitive UV channels (104), each of the UV channels including a respective sensing device and a respective UV interference filter disposed over a UV radiation sensitive portion of the respective sensing device. The respective UV interference filter for each particular one of the channels has transmission characteristics that are spectrally responsive to a spectral signature of a respective chemical substance. In some instances, the method includes integrating signals in each of the UV channels in parallel. The method includes providing a respective integrated signal from each of the UV channels to a signal processor (106), and determining, based at least in part on the respective integrated signals from the UV channels, whether a respective responsivity matches or aligns with the spectral signature of the chemical substance associated with any particular one of the UV channels (108). Determining whether a respective responsivity matches or aligns with the spectral signature of the chemical substance associated with any particular one of the UV channels can include, for example, comparing the respective integrated signals from the UV channels to respective predetermined values. In some instances, the method includes identifying a composition of the sample based at least in part on the comparison (110).

Various modifications can be made within the spirit of the present disclosure. Thus, other implementations are within the scope of the claims.

What is claimed is:

1. An integrated sensor module for detection and discrimination between chemical substances, the sensor module comprising:
  a UV radiation source operable to emit UV radiation onto a sample; and
  a sensor including a plurality of spectrally sensitive UV channels disposed so as to receive UV radiation from the sample, each of the UV channels including a respective sensing device and a respective UV interference filter disposed over a UV radiation sensitive portion of the respective sensing device, the respective UV interference filter for each particular one of the UV channels is a respective customized interference filter having transmission characteristics that are spectrally responsive to a spectral signature of a respective chemical substance; and wherein the respective chemical substance is a respective drug, and wherein the respective customized interference filter of a particular UV channel further corresponds to the inherent sensitivity versus wavelength response of the respective sensing device of the particular UV channel, wherein the respective customized interference filter is configured to pass more light for those wavelengths where the respective sensing device is not as sensitive, and to pass less light for those wavelengths where the respective sensing device is more sensitive.

2. The integrated sensor module of claim 1 wherein the sensor is operable to integrate signals in each of the plurality of UV channels in parallel, the sensor module further including a signal processor operable to perform signal processing of signals from the UV channels to determine whether a respective responsivity matches or aligns with the spectral signature of the chemical substance associated with any particular one of the UV channels.

3. The integrated sensor module of claim 2 wherein the sensor is coupled to the signal processor such that the integrated signals from the UV channels can be provided to the signal processor for comparison to respective predetermined values stored in memory.

4. The integrated sensor module of claim 1 wherein the sensor further includes a UV clear channel operable to measure an overall UV response of the sample within a predetermined UV range.

5. The integrated sensor module of claim 1 wherein the sensor further includes a UV block channel operable to pass non-UV radiation and to block UV radiation, the UV block channel operable to measure the out-of-band radiation emitted to the sample.

6. The integrated sensor module of claim 1 further including a broad band radiation source operable to emit broad band radiation onto the sample, wherein at least some channels in the sensor are operable to detect radiation based on a fluorescence effect of the sample and to provide output signals to a signal processor.

7. The integrated sensor module of claim 1 wherein the sensing device of each UV channel includes a photodiode structure.

8. The integrated sensor module of claim 7 wherein the photodiode structure includes a superposition of two ion-implanted wells having opposite types of electrical conductivity.

9. The integrated sensor module of claim 8 wherein the photodiode structure comprises a semiconductor substrate having a first type of electrical conductivity, wherein the two ion-implanted wells are arranged within the semiconductor substrate and include a first well and a second well arranged within the first well, the second well having the first type of electrical conductivity and the first well having a second type of electrical conductivity, the photodiode structure further includes a photon capturing layer having the second type of electrical conductivity, wherein a p-n junction formed between the photon capturing layer and the second well is operable to detect incident UV radiation.

10. The integrated sensor module of claim 9 wherein in the sensor module further includes a radiation shield disposed between the UV radiation source and the sensor, and the photodiode structure further includes a contact region having the second type of electrical conductivity, the contact region arranged within the second well within the semiconductor substrate for directly contacting the photon capturing layer and a first sense terminal connected to the photon capturing layer via the contact region.

11. The integrated sensor module of claim 1 further including a display coupled to an output of a signal processor, the display being operable to provide a visual indication of a composition of the sample based on whether the respective responsivity matches or aligns with the spectral signature of the chemical substance associated with any particular one of the UV channels.

12. The integrated sensor module of claim 1, wherein for each respective drug, an expected spectral response of the respective drug is convoluted with a spectral responsivity of silicon of the respective sensing device to generate a respective convoluted curve, wherein the respective customized interference filter is provided based on the respective convoluted curve, wherein the respective convoluted curve represents the transmission characteristics of the respective customized interference filter dedicated to the respective drug that the particular UV channel is configured to detect and calibrated to the silicon of the respective sensing device of the particular UV channel.

13. The integrated sensor module of claim 1 wherein the sensor further includes a respective second channel associated with each UV channel, each respective second channel is configured to sense a fluorescence effect of the sample, the sensor module configured to analyze a UV response and a fluorescent response of the sample.

14. A method comprising:
placing a sample in an integrated sensor module operable for detection and discrimination between chemical substances;
emitting UV radiation from a UV radiation source onto the sample;
receiving UV radiation from the sample in each of a plurality of spectrally sensitive UV channels, each of the UV channels including a respective sensing device and a respective UV interference filter disposed over a UV radiation sensitive portion of the respective sensing device, the respective UV interference filter for each particular one of the channels having transmission characteristics that are spectrally responsive to a spectral signature of a respective chemical substance;
providing a respective integrated signal from each of the UV channels to a signal processor; and
determining, based at least in part on the respective integrated signals from the UV channels, whether a respective responsivity matches or aligns with the spectral signature of the chemical substance associated with any particular one of the UV channels; and
wherein the respective UV interference filter for each particular one of the UV channels is a respective customized interference filter having transmission characteristics that are spectrally responsive to a spectral signature of a respective drug, and wherein the method includes determining, based at least in part on the respective integrated signals from the UV channels, whether the respective responsivity matches or aligns with the spectral signature of the drug associated with any particular one of the UV channels, and
wherein the respective customized interference filter of a particular UV channel further corresponds to the inherent sensitivity versus wavelength response of the respective sensing device of the particular UV channel, wherein the respective customized interference filter is configured to pass more light for those wavelengths where the respective sensing device is not as sensitive, and to pass less light for those wavelengths where the respective sensing device is more sensitive.

15. The method of claim 14 including integrating signals in each of the plurality of UV channels in parallel.

16. The method of claim 14 wherein said determining includes comparing the respective integrated signals from the UV channels to respective predetermined values.

17. The method of claim 16 including identifying a composition of the sample based at least in part on said comparing.

18. The method of claim 14, wherein for each respective drug, convoluting an expected spectral response of the respective drug with a spectral responsivity of silicon of the respective sensing device to generate a respective convoluted curve, and providing the respective customized interference filter based on the respective convoluted curve, wherein the respective convoluted curve represents the transmission characteristics of the respective customized interference filter dedicated to the respective drug that the particular UV channel is configured to detect and calibrated to the silicon of the respective sensing device.

* * * * *